JOHN L. KREIDER'S
Improved Check-row, Corn Planter.
No. 122,770.   Patented Jan. 16, 1872.
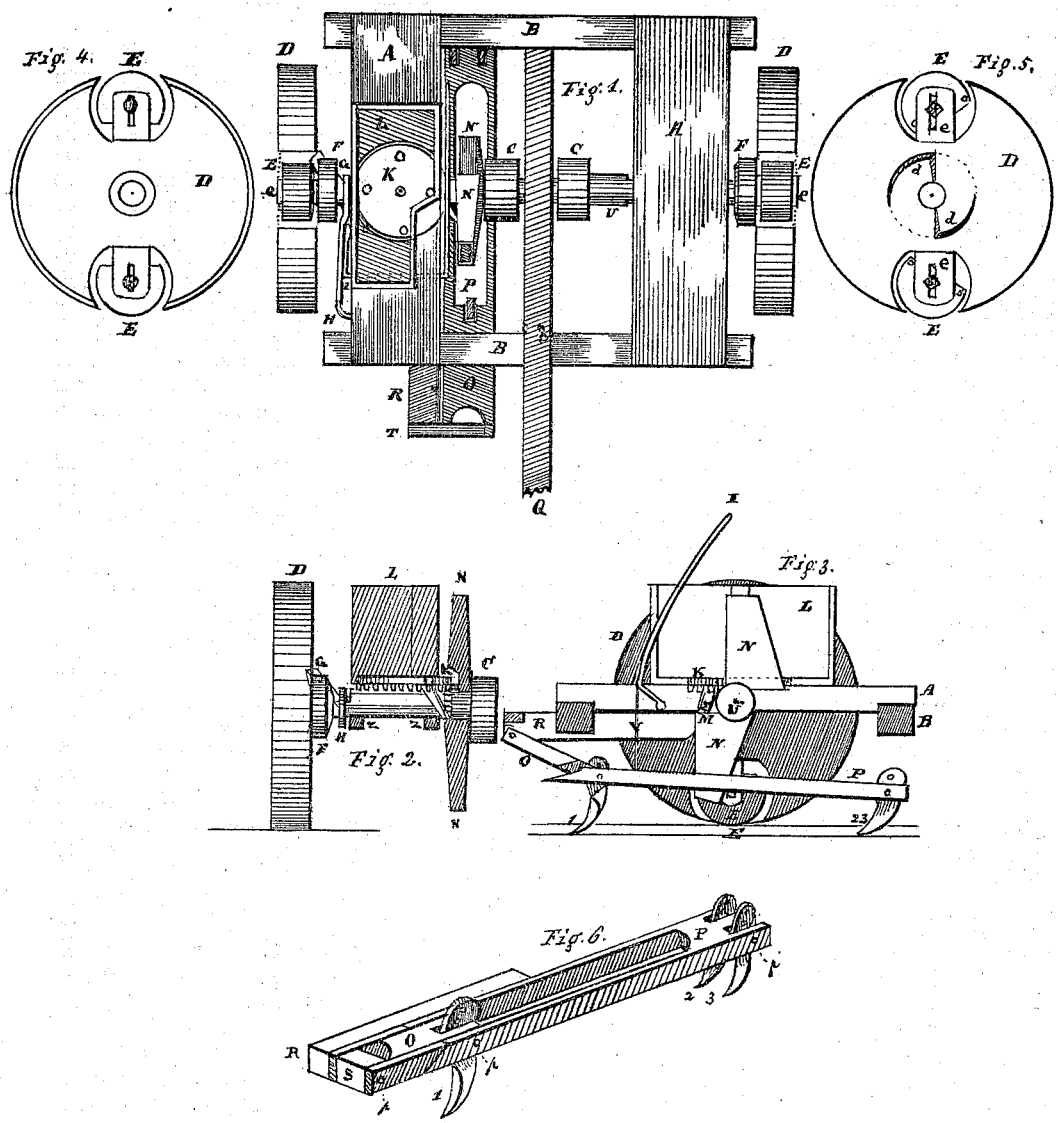
Witnesses.
Inventor.

122,770

UNITED STATES PATENT OFFICE.

JOHN L. KREIDER, OF CHESNUT LEVEL, PENNSYLVANIA.

IMPROVEMENT IN CORN-PLANTERS.

Specification forming part of Letters Patent No. 122,770, dated January 16, 1872.

I, JOHN L. KREIDER, of Chesnut Level, in the county of Lancaster and State of Pennsylvania, have invented certain Improvements in Corn-Planters, of which the following is a specification:

The object of the several improvements on a certain automatic check-row corn-planter, for which Letters Patent No. 92,616, dated July 13, 1869, were granted, is to compensate more effectually for any inequality of the soil or difference in the speed of the horses, so as to secure a true lodgment of the seed at regular intervals, by making the pulleys to the wheels adjustable in slotted bearings.

The accompanying drawing shows the machine with the several improvements in place.

Figure 1 is a top or plan view, showing one side only of the seeding apparatus. Fig. 2 is a front elevation of one side in part; Fig. 3, a side view or elevation with portions left off; Fig. 4, the outer face of one of the wheels with its pulleys and their slotted or adjustable bearings; Fig. 5, the inner face of the same to show the rack $d$, into which the clutch G engages to hold the wheel in its forward motion, which is disengaged by the pawl H and lever I. Fig. 6 shows the jointed and hinged drag-bar in perspective, with the scorer 1 and covering-shovels 2 and 3 detached.

A brief explanation of the drawing and letters of reference marked thereon will enable any one skilled in the art to make and use my invention.

Fig. 1, Q, shows a central beam or pole under the rear cross-piece B, and on top of the front cross-piece B', firmly connected by the side planks A A, which support the seed-hoppers L and cogged and perforated disk K. This hopper has an offset on its side next the tubes N, to allow the cogged disk K to project. The outer rim of the enlarged axle, between the hopper and tubes, is also cogged, and gives motion to the revolving disk K, which has two, four, or more perforations, through which the seed drops into a trough or spout, M, which conveys it into the upper end of the seed-tubes N. These tubes, two in number, are attached to the enlarged axle U of the wheel, and revolve with it while planting, and so as to be vertical when the pulleys strike the furrow; yet, should the machine stop before the pulley reaches the furrow, after the seed has entered the tube, the tube would project forward enough to drop the seed into the furrow, if sufficiently inclined to allow it to slide. Ordinarily, when in motion, the movement of the tubes and seed act in concert, as the seed only drops by the time the tube comes vertical. The segmental pulleys E, inserted in the circumference of the wheels D opposite to each other, are substantially the same as in my former application, but have double bearings $e$, provided with slots and binding-screws to adjust them to the furrows when made nearer together or more remote, according to the distance desired. C shows an enlargement of the axle, to aid in affixing the tubes. F a similar flange or enlargement between the hopper or side planks A and wheels D. This enlarged flange F has a slot for a clutch-bar, G, held by a pivot through the circular flange F, inclined down and inward into a notch in the hub or axle, and is pressed out above by a spring below. This clutch G projects into the semicircular rack-teeth $d$, cut or cast into the inner face of the wheels D, Fig. 5. The axle is surrounded by an annular pawl, H, resting against the clutch G on the axle. The lever I for raising the drag-bar O P by the cord or chain attachment V on the inner side of plank A, is carried horizontally outward and terminates with a wedge over the arm of the pawl H, so that in raising the drag-bar the annular head is wedged out against the base of the clutch G, which disengages the top from the rack-notch $d$ in the wheel, and allows the wheel free motion without operating the seeding apparatus, these rack-notches being shallowed out in such a manner that in backing, the clutch does not engage the notch, but allows the wheel to turn on the axle freely; but in a forward motion they engage and revolve the axle and appliances, always keeping the seed-tubes and wheel-pulleys in unison of position. Each wheel has its independent axle in suitable boxes Z, in connection with the side planks A and center beam Q, as shown. The drag-bar, Fig. 6, is made in two parts. O, the forward portion, is secured by a pivot, $r$, to a head-block, $s$, and side beam R, and top T, Fig. 1, overlapping the ends; the other portion is slotted for a scoring-shovel, 1, with adjustable head for a pivot-bolt, $p$.

The other part, P, of the drag-bar has an open center to admit the revolving tubes to pass between the sides, which have an oblique joint-connection with the part O, and united slotted ends for the two covering-shovels 2 and 3, so as to be on the sides of the score made for planting by the forward central shovel 1, which is in advance of the dropping-tubes, and so as to cover the corn or seed when dropped in the furrow. Fig. 3 illustrates the position of the drag-bar and shovels with the lever I, cord or chain V to raise it up. The front shovel has also an independent motion to overcome obstructions.

I am aware that spouts or tubes are used, but I am not aware that such have been used revolving with the wheel. The segment pulleys E show pins, Fig. 5, to arrest their motion by coming in contact with the sides of the slotted bearings e. These bearings differ from my former arrangement, and are more conveniently and truly made adjustable.

The arrangement of the tubes to convey the corn into the furrow, whether the horses move fast or slow, or stop altogether, will still deposit the seed at the proper point, is found to be perfectly reliable, an object, it is believed, not attained heretofore in machines for checker-planting. The annular pawl and clutch arrangement, and double jointed or hinged drag-bar are also believed to be novel in their construction and application; therefore

What I claim as an improvement, and desire to secure by Letters Patent, is—

The wheels D D, slotted in their outer surface at opposite points to receive the segment pulleys E E, which are supported in slotted bearings e e to admit of the described adjustment.

JOHN L. KREIDER.

Witnesses:
 JNO. M. AMWEG,
 JACOB STAUFFER. (133)